G. L. BIDDLE.
AUTOMATIC WATER SUPPLY FOR COOKING UTENSILS.
APPLICATION FILED FEB. 3, 1913.
1,083,723.
Patented Jan. 6, 1914.
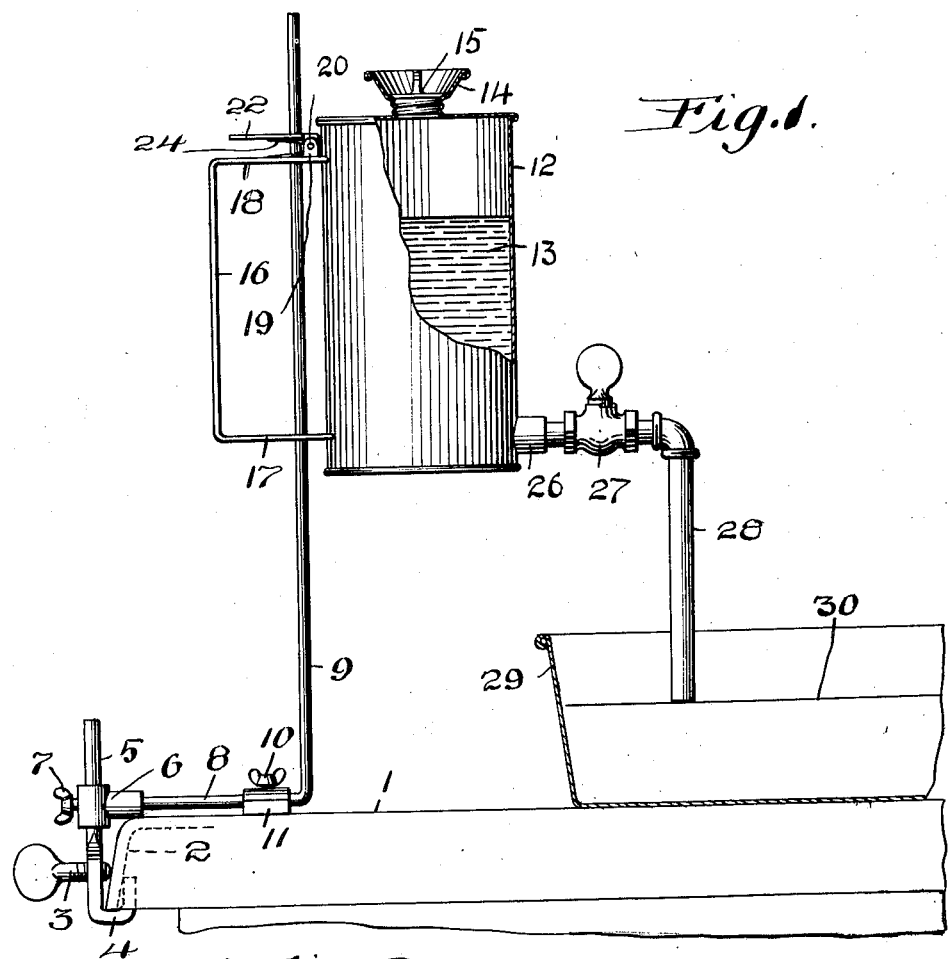
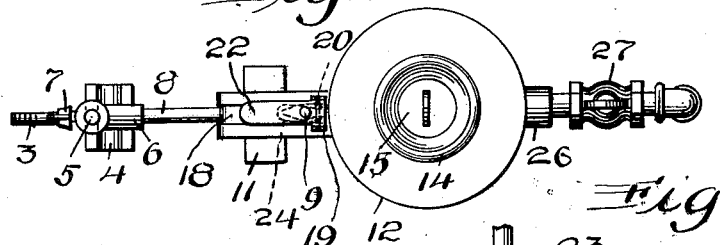
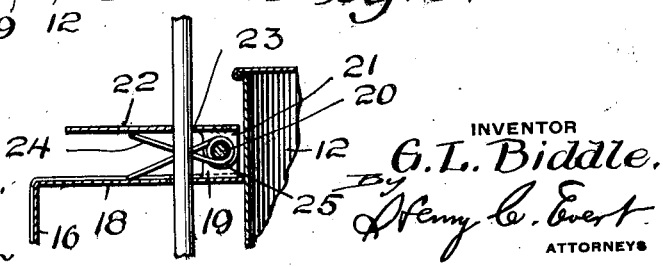
WITNESSES
Samuel Payne
Kane H. Butler
INVENTOR
G. L. Biddle.
By Henry C. Evert
ATTORNEYS

UNITED STATES PATENT OFFICE.

GEORGE LASH BIDDLE, OF McKEESPORT, PENNSYLVANIA.

AUTOMATIC WATER-SUPPLY FOR COOKING UTENSILS.

1,083,723. Specification of Letters Patent. Patented Jan. 6, 1914.

Application filed February 3, 1913. Serial No. 746,072.

*To all whom it may concern:*

Be it known that I, GEORGE LASH BIDDLE, a citizen of the United States of America, residing at McKeesport, in the county of Allegheny and State of Pennsylvania, have invented certain new and useful Improvements in Automatic Water-Supply for Cooking Utensils, of which the following is a specification, reference being had therein to the accompanying drawing.

This invention relates to an automatic water supply for cooking utensils, and the primary object of my invention is to furnish a stove with an attachment embodying a reservoir from which water can be fed by gravity to a utensil upon the stove, thereby preventing the contents of the utensil from "boiling dry."

Another object of this invention is to provide a stove with an upright upon which there is arranged an adjustable reservoir and this reservoir can be positioned to supply water to utensils whereby a predetermined level of water can be retained in the utensils.

A further object of this invention is to accomplish the above results by a device that is simple in construction, durable, applicable to various types of stoves, and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a side elevation of the device, partly broken away and partly in section, Fig. 2 is a plan of the device, and Fig. 3 is an enlarged vertical sectional view of a portion of the device.

Further describing my invention in detail with reference to the accompanying drawing, wherein like numerals denote corresponding parts, throughout:—1 denotes a portion of a stove having a depending flange 2 and clamped to this flange by a set screw 3 is the hook-shaped end 4 of a vertical clamping member 5.

6 denotes a T connection slidably mounted upon the member 5 and adjustably held thereon by a set screw 7. The T connection supports the lateral arm 8 of an upright 9 and adjustably mounted upon the arm 8 by a set screw 10 is a rest or brace 11 that rests upon the top of the stove and coöperates with the clamping member 5 in preventing the upright 9 from tilting or upsetting.

12 denotes a cylindrical reservoir adapted to contain water 13, said reservoir having the top thereof provided with a funnel-shaped filling opening 14 that is normally closed by a screw plug 15. The reservoir 12 has a handle 16 approximately the same length as the reservoir and extending through the brackets 17 and 18 of said handle is the upright 9. The bracket 18 of the handle 16 has apertured ears 19 and pivotally connected to said ears by a transverse pin 20 are the apertured ears 21 of a locking member 22. The locking member 22 has an opening 23 providing clearance for the upright 9, and the walls of the opening 23 are beveled to frictionally engage the upright 9 and hold the reservoir 12 in adjusted position. The locking member 22 is frictionally held in engagement with the upright 9 by the ends 24 of a spring 25 that is coiled around the pivot pin 20.

26 denotes an outlet connection adjacent to the bottom of the reservoir 12 and this connection is provided with a valve 27 and a depending outlet pipe or spout 28. The valve 27 is of the ordinary and well known type and the outlet pipe or spout 28 is adapted to extend into a utensil 29 and maintain a level of water 30 within said utensil.

With the reservoir 12 containing water the valve 27 can be opened to supply a prescribed quantity of water, by gravity, to the utensil 29 to prevent the contents thereof from "boiling dry."

It is through the medium of the locking member 22 that the reservoir 12 can be correctly positioned relatively to the upright 9 whereby the water feeding device can be used in connection with receptacles of various sizes for maintaining water levels of different heights. It is through the medium of the clamping member 5 that the upright can be adjusted and correctly positioned upon stoves of various sizes and types.

While in the drawing there is illustrated a preferred embodiment of the invention, it is to be understood that the structural elements are susceptible to such variations and modifications as fall within the scope of the appended claims.

What I claim is:—

1. An automatic water feeding device for cooking utensils comprising a clamping member adapted to be secured to a stove, an upright adjustably supported by said clamping member, a vertically adjustable reservoir provided with a handle through which extends said upright, means carried by the handle and engaging the said upright for maintaining the reservoir in the position to which it has been adjusted, an outlet connection at the bottom of said reservoir, and a valve for controlling the outlet of the contents of said reservoir.

2. In a water feeding device for cooking utensils, an adjustable supporting upright, a vertically adjustable reservoir provided with a handle through which extends said upright, means pivotally connected to the handle and capable of engaging said upright for maintaining the reservoir in the position to which it has been adjusted, said reservoir provided with an outlet, and means for controlling said outlet.

3. An automatic water feeding device for cooking utensils comprising an upright, a reservoir having a handle through which extends said upright, and a clamping device pivotally connected to the top of the handle and engaging the said upright for adjustably connecting said reservoir thereto, an outlet pipe carried by said reservoir, means in connection with said pipe for controlling the outlet of said reservoir, and means in connection with said upright for supporting the same in proximity to a utensil.

4. A water feeding device comprising a vertically adjustable supporting upright, a reservoir, a handle secured to said reservoir and including an upper and lower bracket through which extends said upright, a locking member pivotally connected to the upper of said brackets and capable of engaging said upright for adjustably connecting the reservoir thereto, and a valved outlet for said reservoir.

In testimony whereof I affix my signature in the presence of two witnesses.

GEORGE LASH BIDDLE.

Witnesses:
J. P. BIDDLE,
MAX H. SROLOVITZ.